United States Patent [19]

Morigaki et al.

[11] Patent Number: 4,997,730
[45] Date of Patent: Mar. 5, 1991

[54] NONAQUEOUS ELECTROCHEMICAL CELL AND A METHOD OF MANUFACTURING THE SAME

[75] Inventors: Kenichi Morigaki, Osaka; Shigeo Kobayashi, Kyoto; Hiroshi Fukuda, Osaka; Shuichi Nishino, Osaka; Tomokazu Mitamura, Osaka, all of Japan

[73] Assignee: Matsushita Electric Industrial Co., Ltd., Osaka, Japan

[21] Appl. No.: 469,181

[22] Filed: Jan. 24, 1990

[30] Foreign Application Priority Data

Jan. 24, 1989 [JP] Japan .................................. 1-15342
Nov. 30, 1989 [JP] Japan ................................. 1-311145

[51] Int. Cl.⁵ ..................... H01M 10/04; H01M 10/36
[52] U.S. Cl. ......................................... 429/48; 429/52; 429/101; 429/196; 29/623.5
[58] Field of Search ................... 429/101, 196, 48, 52; 29/623.5

[56] References Cited

U.S. PATENT DOCUMENTS

| 3,993,501 | 11/1976 | Kalnoki-Kis | 429/48 |
| 4,228,229 | 10/1980 | Gabano | 429/196 |
| 4,277,545 | 7/1981 | Kalnoki-Kis | 429/48 |
| 4,278,741 | 7/1981 | Kalnoki-Kis | 429/48 |
| 4,402,995 | 9/1983 | Fleischer | 427/58 |
| 4,421,834 | 12/1983 | Zupancic | 429/105 |
| 4,440,836 | 4/1984 | Bailey | 429/196 |
| 4,608,322 | 8/1986 | Howard et al. | 429/196 |
| 4,608,753 | 9/1986 | Fleischer | 429/196 |
| 4,888,255 | 12/1989 | Yoshimitsu | 429/196 |

OTHER PUBLICATIONS

Boyd, J. Electrochem. Soc. 134, 18–24, (1987).

*Primary Examiner*—Donald L. Walton
*Attorney, Agent, or Firm*—Wenderoth, Lind & Ponack

[57] ABSTRACT

The invention relates to a nonaqueous electrochemical cell comprising an alkali metal anode, an oxyhalide or other cathode-electrolyte solvent which is liquid at ambient temperature, and a porous carbonaceous cathode collector, the cathode-electrolyte containing at least polyethylene terephthalate as an additive for minimizing the voltage delay, i.e. a large voltage drop in an initial stage of discharge.

8 Claims, 1 Drawing Sheet

NONAQUEOUS ELECTROCHEMICAL CELL AND A METHOD OF MANUFACTURING THE SAME

BACKGROUND OF THE INVENTION

The present invention relates to a nonaqueous electrochemical cell comprising an alkali metal, such as metallic lithium, as an anode active substance, an oxyhalide or the like which is liquid at ambient temperature as a cathodic active substance-electrolyte solvent, and a porous carbonaceous element as a cathode collector.

BRIEF DESCRIPTION OF THE RELATED ART

In a nonaqueous electrochemical cell comprising an alkali metal, such as metallic lithium, as an anode active substance, an oxyhalide or the like which is liquid at ambient temperature as a cathodic active substance-electrolyte solvent, and a porous carbonaceous element as a cathode collector, the anode active substance and the cathode active substance are directly contacted with each other so that a discharge reaction product is formed on their interface by self-discharge. This discharge reaction product forms a progressively growing film on the surface of the anode active substance, such as metallic lithium, but as this film increases in thickness, it functions as a protective or passivating film preventing direct contact of the cathode active substance and anode active substance to prevent a loss of capacity due to self-discharge of the cell and any further film growth is also arrested. However, such a film formed on the surface of the anode acts as resistance component in discharge of the cell to cause a large voltage drop in the initial stage of large current discharge. This marked voltage drop occurring in the initial stage of discharge is known as voltage delay.

To diminish this voltage delay in a cell using a liquid cathodic active substance such as an oxyhalide, it has been proposed to add a variety of additives to the liquid cathode-electrolyte system. Among these additives are high molecular materials such as polyvinyl chloride (U.S. Pat. No. 3,993,501), alkyl 2-cyanoacrylates (U.S. Pat. No. 4,402,995) and chlorinated polypropylene (JP-A No. 60-249253; JP-A means Japanese Patent Laid-Open Application) and inorganic materials such as $Li_2O$ (U.S. Pat. No. 4,228,229), $Li_2B_{10}Cl_{10}$ (U.S. Pat. No. 4,071,664) and $SeO_2$ (JP-A No. 62-43069). With regard to method of incorporation of such additives, addition to the active substance-electrolyte solution (U.S. Pat. No. 4,277,545), formation of a vinyl polymer film on the anode (U.S. Pat. No. 3,993,501), formation of a vinyl polymer film on the separator (U.S. Pat. No. 4,278,741) and formation of a vinyl polymer film on the porous carbonaceous cathode collector (U.S. Pat. No. 4,560,632) have been proposed and claimed to be practically successful.

In order to assure an effective utilization of the liquid cathode-electrolyte, the porous carbonaceous cathode collector which functions as the site of discharge reaction and the separator isolating the anode from the cathode must respectively have a sufficient porosity to assure a stable retention of the liquid cathode-electrolyte. Taking the carbonaceous cathode collector as an example, its porosity is preferably 82% (U.S. Pat. No. 4,228,229) or 80 to 90% (JP-A No. 59-171467). With regard to the separator, the preferred porosity is said to be 50 to 75% or it may be a glass fiber separator containing 91 to 94 weight % of glass fiber (U.S. Pat. No. 4,421,834). The use of an acrylic resin has also been proposed to implement a separator of improved mechanical strength (JP-A No. 61-16465). The technologies of incorporating various additives in the liquid cathode-electrolyte are disadvantageous in that some involve complicated assembling procedures, others tend to detract from environmental safety and still others entail increased production costs. Furthermore, the cells so fabricated may normally function fairly well but at high ambient temperatures or in an early stage of large-current discharge, they show a voltage drop, known as voltage delay, so that these cells are not sufficiently useful for practical purposes.

Furthermore, in order to assure an effective utilization of the liquid cathode-electrolyte, it is essential to use a highly porous carbonaceous cathode collector and a glass fiber separator rich in porosity and glass component. This means that both the cathode collector and separator are not sturdy enough, thus causing troubles in the fabrication of cells.

It is an object of the present invention to provide a nonaqueous electrochemical cell with a minimum of voltage delay even at a high ambient temperature or on prolonged storage.

It is a further object of the invention to provide a nonaqueous electrochemical cell which overcomes the disadvantages, in terms of mechanical strength, of the highly porous carbonaceous cathode collector and glass fiber separator necessary for effective utilization of a liquid cathode-electrolyte and which can be fabricated with high reproducibility and at low cost.

SUMMARY OF THE INVENTION

The above-mentioned objects are accomplished by the present invention, which comprises employing polyethylene terephthalate as an essential additive for suppressing the voltage delay in a nonaqueous electrochemical cell.

It was discovered that the addition of polyethylene terephthalate can be accomplished by any of such procedures as addition to the liquid cathode-electrolyte, addition to the glass fiber separator, and addition to the porous carbonaceous cathode collector.

It was further discovered that the voltage delay can be inhibited by using polyvinyl chloride, in addition to polyethylene terephthalate, as a second additive. As a further feature, the invention comprises impregnating a porous carbonaceous cathode collector or a glass fiber separator with polyethylene terephthalate. By this procedure, the mechanical strength of the collector or the separator can be enhanced and the internal short-circuit of the cell due to breakage of the separator or chipping of the porous carbonaceous cathode collector in the fabrication of the cell can be prevented.

The term 'separator' as used herein means not only a cylindrical body as such but also the member at the top or bottom thereof which serves to hold the porous carbonaceous cathode collector in isolation from the lithium anode and the cell housing.

By these innovations briefly mentioned above, the inventors provided a nonaqueous electrochemical cell showing a minimum of voltage delay even at a high ambient temperature or an prolonged storage.

Furthermore, even with a sufficient porosity to assure an effective utilization of the liquid cathode-electrolyte, it is by now possible to provide a glass fiber separator and a porous carbonaceous collector both having sufficient mechanical strength.

One theory about the rationale of addition of a high polymer additive for inhibiting the voltage delay in association with the use of a liquid cathode active substance such as an oxyhalide is shown in the paper of J. W. Boyd which discusses on the effect of polyvinyl chloride on the film growth and voltage delay in the thionyl chloride ($SOCl_2$) electrolyte system (J. Electrochem. Soc. 134, 18–24, 1987). According to the author, the beneficial effect of polyvinyl chloride on passivation on the lithium surface in 1.5 moles/l $LiAlCl_4$-$SOCl_2$ solution is said to result from the following two effects of PVC.

(1) As the lithium surface is coated with a vinyl polymer, the coating serves as a spacer between lithium (Li) and lithium chloride (LiCl) films so that the LiCl film becomes easier to be broken as the current flows.

(2) As the vinyl polymer is deposited on LiCl crystals, normal crystal growth is hindered to form large pores and tunnels, thus facilitating ion conduction.

Polyethylene terephthalate (PET) is a polymer of the formula (1)

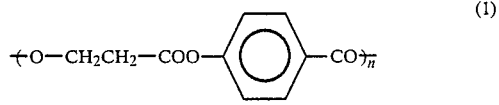

and, as such, differs from polyvinyl chloride (PVC) of the formula (2)

However, it is probable that the lithium surface is coated with PET in a similar manner to what happens with PVC. The mechanism of deposition or binding of PVC on the Li surface remains to be elucidated but if the contribution of the C—Cl bond is postulated, the presence of carbonyl

and carboxyl residue (COO) in PET, too, suggests the deposition or binding of PET on the Li surface by the same mechanism. For example, assuming that the electronegativity of a substituent is a factor, it is 0.21 in the case of (C—Cl) and 0.42, or about two-fold higher, for (C=O). (Minoru Imoto: Organic Electron Theory 1, Kyoritsu Zensho 55, Kyoritsu Shuppan, Japan, p 29–32 (1955)).

However, the fact that the concomitant presence of PET and PVC results in a marked inhibition of voltage delay suggests that the effect of PET is different from that of PVC. A possible explanation of the effect of PET is the effect (1) proposed by Boyd, that is the covering of the Li surface. On the other hand, the effect of PVC may be the effect (2), that is deposition on LiCl crystals which inhibits the growth of LiCl crystals.

Furthermore, both PET and PVC are dissolved in an oxyhalide such as thionyl chloride as colloidal polymers in the cell but when their concentrations are high, they adhere not only to the Li surface but to the surfaces of the porous carbonaceous cathode collector and separator to function as resistance factors contributing to a voltage drop in discharge. Therefore, the upper limit of addition is preferably 3.0 weight % for PET and 0.5 weight % for PVC.

Therefore, when they are dissolved in the liquid cathode-electrolyte, the preferred concentration range of PET is 0.01 to 3.0 weight % and that of PVC is 0.01 to 0.5 weight %. If the concentration of either additive is less than 0.01 weight %, the desired effect cannot be fully accomplished.

When PET is incorporated in the glass fiber separator, the preferred range of addition per unit area of the separator is 1 to 30 $g/m^2$. When the additive is to be incorporated in the porous carbonaceous cathode collector, the preferred range is 1 to 10 weight % based on the total weight of the cathode. When PET is incorporated in the separator and/or the porous carbonaceous cathode collector, the PET first dissolves within the cell and, then, acts on the Li surface and, therefore, the minimum requirement is increased as compared with addition to the electrolyte. Moreover, when PET is used in a large amount as the binder, dissolution of PET within the cell leads to a decrease in mechanical strength so that in the case of addition to the porous carbonaceous collector, for instance, the molded collector tends to be cracked or chipped to detract from its collector function and, hence, a decrease in discharge capacity. In the case of addition to the separator, too, the separator becomes liable to be broken and the resulting internal micro-short-circuits leads to a decreased discharge capacity.

A disadvantage of addition of PET to the liquid cathode active substance, which is particularly pronounced when the PET concentration is high, is that this polymer is liable to be precipitated within the piping system used in the filling process to cause system clogging and other troubles or a fluctuation in filling volume. On the other hand, in the case of the separator and porous carbonaceous cathode collector, since both are inherently high in porosity and low in mechanical strength, breakage or chipping tends to occur in cell assembling to increase the incidence of rejects.

Therefore, the incorporation of PET in the separator or the porous carbonaceous cathode collector serves to increase their mechanical strength to reduce the incidence of rejects in the fabrication of cells and contributes to a marked improvement in filling uniformity. Which of the separator and the porous carbonaceous cathode collector is to be chosen for incorporation of PET depends on their relative mechanical strength as well as the manufacturing method adopted but in view of its geometrical proximity to the anode surface, the separator is the better choice. The incorporation of PET in the porous carbonaceous cathode collector also serves to increase the collector porosity due to the pores left behind after dissolution of PET to thereby improve the discharge efficiency. In addition, the incorporation of PET in the separator or the porous carbonaceous cathode collector contributes to a reduced incidence of rejects in cell assembling but requires additional steps for adding PET, washing and drying, thus complicating the manufacturing process and, hence, resulting in an industrial disadvantage. Furthermore, the use of PET as an exclusive binder leads to a marked reduction of strength after release of PET within the cell so that the normal discharge function cannot be obtained. Therefore, it is sometimes advisable to use PET in combination with a different binder in the fabrication of the porous carbonaceous cathode collector. The acrylic resin which is the common binder for the glass fiber separator is resistant to the electrolyte but is not much effective in improving the mechanical strength of the separator. Therefore, a separator satisfactory in cell characteristics and manufacturing technology can be provided by using PET and an acrylic resin in the optimum ratio of 1:0.5 to 1.5. In the case of the porous carbonaceous cathode collector, too, the use of PET in combination with polytetrafluoroethylene (PTFE), which is one of the common binders, results in improved mechanical strength of the cathode and improved porosity due to formation of effective pores in the collector. However, the release of PET within the cell causes a decrease in the mechanical strength of the porous carbonaceous cathode collector. Therefore, the use of PET in a large proportion may adversely affect the cell characteristics. Therefore, the optimum proportion of PET is 1 to 10 weight % of the total cathode weight. Similarly, polytetrafluoroethylene (PTFE), when used in combination with PET, assures sufficient strength even in a small amount but in view of the balance between mechanical strength and effective pore volume, the optimum proportion of PTFE is 5 to 20 weight % of the total cathode weight.

DETAILED DESCRIPTION OF THE PREFERRED EMBODIMENTS

Figure 1:
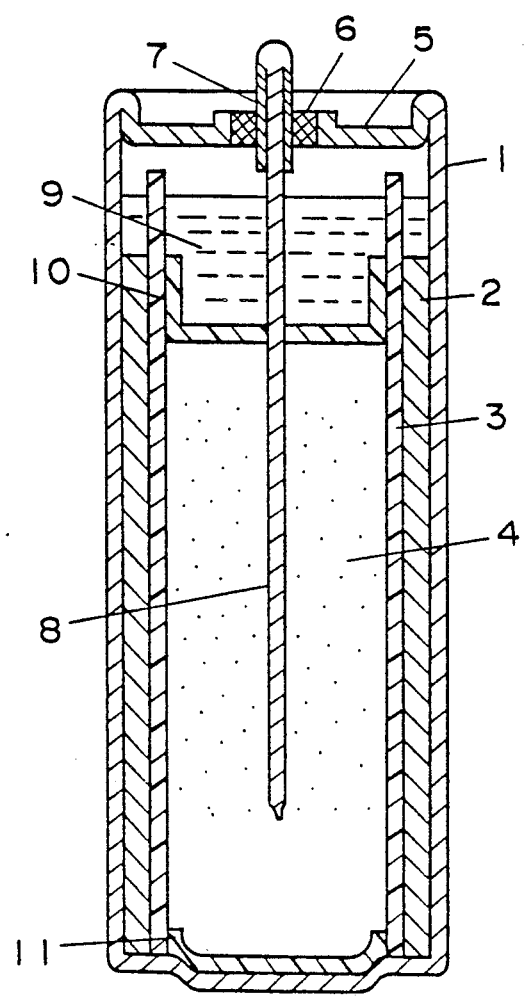
FIG. 1 is a cross-section view showing an embodiment of the nonaqueous electrochemical cell according to the invention.

The preferred embodiments of the invention are described below, taking a thionyl chloride-lithium cell as an example and referring to the accompanying drawing.

EXAMPLE 1

Referring to FIG. 1 which is a cross-section view showing a bobbin-shaped thionyl chloride-lithium electrochemical cell, the reference numeral 1 represents a stainless steel cell housing which serves as an anode terminal, and 2 represents a cylindrical metallic lithium element measuring 0.85 mm thick, 37 mm long and 37 mm wide and fitted against the inner surface of said cell housing for functioning as an anode. The reference numeral 3 represents a glass fiber separator containing 15 weight % of an arylic resin binder and measuring 0.2 mm in thickness, and 4 represents a porous carbonaceous collector extrusion-molded from a well-kneaded mixture of 78 weight % acetylene black, 9 weight % artificial graphite, 13 weight % PTFE binder with water-ethanol and dried in vacuo at 150° C. for 12 hours. The cathode is a cylinder, 10 mm in diameter and 30 mm high, with a porosity of 82%. Represented by the numeral 5 is a stainless steel cell cover, the peripheral edge thereof being laser-welded to the open end of said cell housing 1. Disposed in the center of said cell cover 5 is a hollow cathode terminal 7 insulated by glass wool 6. This cathode terminal 7 is laser-melded, at its top, to a nail-shaped cathode collector 8. Indicated at 9 is a liquid cathode-electrolyte. This liquid is prepared by dissolving lithium tetrachloroaluminate (LiAlCl$_4$) in thionyl chloride at a final electrolyte concentration of 1.2 moles/liter and adding polyethylene terephthalate (PET) at a concentration of 0.5 weight %. The volume of the cathode active substance-electrolyte solution is 4.0 ml.

The reference numerals 10 and 11 represent a top and a bottom separator, each made of the same glass fiber material as the separator 3.

EXAMPLE 2

An electrochemical cell was fabricated in the same manner as Example 1 except that a thionyl chloride solution containing 1.2 moles/l of LiAlCl$_4$, 0.5 weight % of PET and 0.1 weight % of polyvinyl chloride (PVC) was used as the liquid cathode-electrolyte.

EXAMPLE 3

In 100 ml of o-chlorophenol was dissolved 5 g of PET by heating at 60°–70° C. The same glass fiber separator as the one used in Example 1 was impregnated with the above PET solution for one hour and, then, washed thoroughly with ethanol to remove the o-chlorophenol. The separator was then dried in vacuo at 110° C. to give a finished glass fiber separator with a PET content of about 12 g/m$^2$. Using this separator, an electrochemical cell was fabricated in otherwise the same manner as Example 1.

EXAMPLE 4

Except that a thionyl chloride solution of 1.2 moles/l of LiAlCl$_4$ supplemented with 0.1 weight % of PVC was used as a cathode-electrolyte solution, the procedure of Example 3 was repeated to fabricate an electrochemical cell.

EXAMPLE 5

Except that a glass fiber separator impregnated with 15 weight % of PET and 15 weight % of an acrylic resin as binders was used, a finished glass fiber separator was prepared in otherwise the same manner as Example 1.

EXAMPLE 6

Using the separator of Example 5 and the thionyl chloride electrolyte solution of Example 4, an electrochemical cell was fabricated in the same manner as Example 1.

EXAMPLE 7

In 100 ml of dimethylformamide was dissolved 6 g of PET by heating at 50°–60° C. The same molded porous carbonaceous cathode collector as used in Example 1 was impregnated with the resulting PET solution and washed thoroughly with water and ethanol to remove the solvent dimethylformamide. The collector was then dried in vacuo to give a porous carbonaceous cathode collector with a PET content of about 6 weight %. Except that the above carbonaceous collector was employed, the same procedure of Example 1 was followed to fabricate an electrochemical cell.

EXAMPLE 8

Using the carbonaceous collector of Example 7 and the thionyl chloride electrolyte solution of Example 4, the procedure of Example 1 was repeated to fabricate an electrochemical cell.

EXAMPLE 9

A well-blended mixture of finely divided PET fiber, acetylene black and artificial graphite was kneaded with an aqueous dispersion of polytetrafluoroethylene (PTFE), ethanol and water and the resulting composition was extrusion-molded. The composition consisted of 76 weight % acetylene black, 8 weight % artificial graphite, 13 weight % PTFE and 3 weight % PET. The molded collector was then dried in vacuo at 150° C. for 12 hours to give a finished porous carbonaceous cathode collector measuring 10 mm in diameter and 30 mm high. Except that this cathode collector was used, the procedure of Example 1 was repeated to fabricate an electrochemical cell.

EXAMPLE 10

Using the porous carbonaceous cathode collector of Example 9 and the thionyl chloride electrolyte solution of Example 4, an electrochemical cell was fabricated in otherwise the same manner as Example 1.

COMPARATIVE EXAMPLE 1

Using a solution 1.2 moles/l LiAlCl$_4$ in thionyl chloride, an electrochemical cell was fabricated in the same manner as Example 1.

COMPARATIVE EXAMPLE 2

Using the thionyl chloride electrolyte solution containing 0.1 weight % of PVC prepared in the same manner as Example 4, an electrochemical cell was fabricated in the same manner as Example 1.

COMPARATIVE EXAMPLE 3

Using a binder-free glass fiber separator, an electrochemical cell was fabricated in otherwise the same manner as Comparative Example 1.

The electrochemical cells according to Examples 1 to 10 and Comparative Examples 1 to 3 were fabricated in 20 units each and the incidence of in-process rejects was investigated. The results are set forth in Table 1.

TABLE 1

| Example | Incidence of rejects (%) | Example | Incidence of rejects (%) | Comparative Example | Incidence of Rejects (%) |
| --- | --- | --- | --- | --- | --- |
| 1 | 5 | 6 | 0 | 1 | 10 |
| 2 | 25 | 7 | 0 | 2 | 15 |
| 3 | 0 | 8 | 0 | 3 | 60 |
| 4 | 0 | 9 | 0 | | |
| 5 | 0 | 10 | 0 | | |

In regard of the electrochemical cell of Example 2, filling troubles resulted in 5 rejects out of the 20 units. The other rejects were all attributable to breakage of the separator and chipping of the porous carbonacious cathode collector. In the case of the glass fiber separator of Comparative Example 3, the mechanical strength of the separator was too low to enable successful fabrication of a cell. It is clear that with the separator and porous carbonaceous cathode collector of the invention, which has been improved in mechanical strength, the incidence of rejects in cell assembly can be drastically reduced.

Then, the internal resistance of the cell was measured at 1 KHz for 10 wholesome units of the cells of Examples 1 to 10 and Comparative Example 1 to 2, excluding the cell of Comparative Example 3 which showed a vary high incidence of rejects, one day and one week after fabrication. The minimum and maximum values are presented in Table 2. These units of the cells were also stored at 60° C. for 20 days and the internal resistance of the cell was similarly measured. The results are also shown in Table 2. Furthermore, the cells showing a median internal resistance after the 20-day storage at 60° C. were subjected to constant current discharge at 40 mA (20° C.) and the minimum voltage in the initial stage of discharge (up to 50 msec) was measured. The results are also presented in Table 2.

TABLE 2

| | Internal resistance (min. value ~ max. value/Ω) | | | Lowest voltage/mV |
| --- | --- | --- | --- | --- |
| | One day after fabrication | One week after fabrication- | After 20 days at 60° C. | (20° C., 40 mA discharge) (after 20 days at 60° C.) |
| Example | | | | |
| 1 | 9~10 | 18~24 | 34~52 | 2,608 |
| 2 | 5~6 | 10~15 | 19~25 | 2,927 |
| 3 | 10~17 | 20~27 | 45~65 | 2,488 |
| 4 | 5~8 | 10~12 | 22~28 | 2,820 |
| 5 | 10~15 | 22~30 | 48~66 | 2,475 |
| 6 | 5~6 | 10~13 | 24~30 | 2,898 |
| 7 | 15~20 | 22~34 | 46~68 | 2,673 |
| 8 | 10~18 | 15~22 | 28~40 | 2,854 |
| 9 | 20~35 | 25~38 | 43~72 | 2,341 |
| 10 | 12~28 | 14~30 | 31~63 | 2,398 |
| Comparative Example | | | | |
| 1 | 27~41 | 56~70 | 100~135 | 1,285 |
| 2 | 9~15 | 16~25 | 35~41 | 2,244 |

It is apparent from Table 2 that the internal resistance of the cell is decreased by the presence of PVC. On the other hand, with PET alone, the internal resistance is equal to, or higher than, that found with PVC alone (Comparative Example 2) but about ½ of the internal resistance of the cell containing no additive (Comparative Example 1). When PET and PVC are used in combination, the internal resistance is further halved. In the case of Examples 7 to 10 where PET was incorporated in the porous carbonaceous cathode collector, the internal resistance values were slightly higher than the other examples, suggesting that the resistance is increased partly due to a time delay till PET is released from the porous carbonaceous cathode collector and acts on the lithium surface and partly due to deposition of PET on the separator and collector surfaces.

The voltage delay in the cells was evaluated by subjecting the cells after the 20-day storage at 60° C. to a constant current discharge of 40 mA and measuring the lowest voltage in the initial stage of discharge (up to 50 msec). The data showed that all the cells of Examples 1 to 10 of the invention are superior to the cell of Comparative Example 2. It is also seen that the combined use of PET and PVC is more effective than the use of PET alone (for example, Example 1 vs. Examples 2, 3 and 4). As to Examples 9 and 10 where PET fiber was incorporated as a binder in the porous carbonaceous cathode collector, the effects were less than those in the other Examples and the plausible reason for this difference is that PET in these porous carbonaceous cathode collectors are harder to be released into the electrolyte.

Based on the foregoing results, it is thought that the combined use of PET and PVC inhibits increase of cell internal resistance, i.e. an increase in thickness of the LiCl film, to minimize the voltage delay in large current discharge because of the composite effect of deposition of PET on the lithium or LiCl layer to make the LiCl layer liable to be destroyed and deposition of PVC on the crystal lattice of LiCl to inhibit growth of LiCl crystals.

The cells according to Examples 1 to 10 of the invention and those of Comparative Examples 1 and 2 were stored at 60° C. for 20 days and then subjected to a discharge test using a constant discharge loading of 300 $\Omega$ at 20° C. and the discharge time till a terminal voltage of 2.5 V was measured. The results are presented in Table 3.

TABLE 3

| Example | Discharge time (H) | Example | Discharge time (H) | Comparative Example | Discharge time (H) |
|---------|--------------------|---------|--------------------|--------------------|--------------------|
| 1 | 158 | 6 | 157 | 1 | 138 |
| 2 | 155 | 7 | 158 | 2 | 145 |
| 3 | 152 | 8 | 161 | | |
| 4 | 156 | 9 | 160 | | |
| 5 | 153 | 10 | 161 | | |

It is apparent from Table 3 that the electrochemical cells according to Examples 1 to 10 of the invention are invariably superior to those according to Comparative Examples. It is also clear that the cells according to Examples 7 to 10 in which PET was incorporated in the porous carbonaceous cathode collector give longer discharge times indicating improvements in discharge efficiency.

It should be understood that the method of incorporating PET is not limited to the one used in the examples but the use of other oxyhalides such as trifluoroacetic acid, concentrated sulfuric acid, thionyl chloride, etc. as solvents and the use of a thin film of PET as bonded by fusion also fall within the scope of the invention.

It should also be understood that although PET was incorporated selectively in the liquid cathode active substance-electrolyte, the separator or the porous carbonaceous cathode collector, it is possible to incorporate PET in more than one of these members. The effects of the invention can also be implemented by using the PET-containing separator in combination with any other separator or incorporating PET only in the top separator and/or the bottom separator.

Thus, by adding polyethylene terephthalate and, as a second additive, polyvinyl chloride, the present invention provides a nonaqueous electrochemical cell with a minimum of voltage delay. Furthermore, the present invention provides a method of manufacturing a nonaqueous electrochemical cell which comprises incorporating polyethylene terephthalate in the separator or the porous carbonaceous cathode collector to thereby reduce the incidence of in-process rejects in a remarkable degree.

What is claimed is:

1. A nonaqueous electrochemical cell comprising an alkali metal anode, a glass fiber separator, a liquid cathode-electrolyte and a porous carbonaceous cathode collector, said liquid cathode-electrolyte containing 0.01 to 3.0 weight percent of polyethylene terephthalate.

2. The nonaqueous electrochemical cell according to claim 1 wherein said liquid cathode-electrolyte contains 0.01 to 0.5 weight percent of polyvinyl chloride in addition to 0.01 to 3.0 weight percent of said polyethylene terephthalate.

3. A nonaqueous electrochemical cell comprising an alkali metal anode, a glass fiber separator, a liquid cathode-electrolyte, and a porous carbonaceous cathode collector, said glass fiber separator containing, as binders, polyethylene terephthalate and an acrylic resin in a weight ratio of 1:0.5 through 1.5.

4. The nonaqueous electrochemical cell according to claim 3 wherein said liquid cathode-electrolyte contains 0.01 to 0.5 weight percent of polyvinyl chloride.

5. A nonaqueous electrochemical cell comprising an alkali metal anode, a glass fiber separator, a liquid cathode-electrolyte, and a porous carbonaceous cathode collector, said porous carbonaceous cathode collector containing, as binders, polyethylene terephthalate and polytetrafluoroethylene in proportions of 1 to 10 weight percent and 5 to 20 weight percent, respectively, based on the total weight of the cathode.

6. The nonaqueous electrochemical cell according to claim 5 wherein said liquid cathode-electrolyte contains 0.01 to 0.5 weight percent of polyvinyl chloride.

7. A method of manufacturing a nonaqueous electrochemical cell consisting generally of an alkali metal anode, a glass fiber separator, a liquid cathode-electrolyte, and a porous carbonaceous cathode collector, which comprises incorporating 1 to 30 g/m$^2$ of polyethylene terephthalate in said glass fiber separator.

8. A method of manufacturing a nonaqueous electrochemical cell consisting generally of an alkali metal anode, a glass fiber separator, a liquid cathode-electrolyte, and a porous carbonaceous cathode collector, which comprises incorporating polyethylene terephthalate in said porous carbonaceous cathode collector in a proportion of 1 to 10 weight percent of the total weight of the cathode.

* * * * *